United States Patent [19]

Takayama

[11] Patent Number: 5,260,774
[45] Date of Patent: Nov. 9, 1993

[54] WHITE BALANCE CONTROL FOR STILL IMAGE SENSING APPARATUS

[75] Inventor: Tsutomu Takayama, Kanagawa, Japan

[73] Assignee: Canon Kabushiki Kaisha, Tokyo, Japan

[21] Appl. No.: 508,789

[22] Filed: Apr. 12, 1990

[30] Foreign Application Priority Data

Apr. 20, 1989 [JP] Japan .................................... 1-98739
Apr. 20, 1989 [JP] Japan .................................... 1-98740

[51] Int. Cl.$^5$ .......................... H04N 9/64; H04N 9/04
[52] U.S. Cl. ........................................ 358/29; 358/41
[58] Field of Search ............... 358/909, 43, 41, 209, 358/213.19, 29, 29 C, 98

[56] References Cited

U.S. PATENT DOCUMENTS

| | | | |
|---|---|---|---|
| 4,219,841 | 8/1980 | Wishimura et al. | 358/29 C |
| 4,667,237 | 5/1987 | Yokomizo | 358/160 |
| 4,754,323 | 6/1988 | Kaji et al. | 358/44 |
| 4,774,564 | 9/1988 | Konishi | 358/29 |
| 4,827,332 | 5/1989 | Miyake et al. | 358/29 |
| 4,868,667 | 9/1989 | Tani et al. | 358/228 |
| 4,875,091 | 10/1989 | Yamada et al. | 358/42 |
| 4,879,591 | 11/1989 | Takei | 358/29 |
| 4,931,858 | 6/1990 | Honjo | 358/37 |
| 4,954,884 | 9/1990 | Nakayama et al. | 358/29 |
| 4,963,978 | 10/1990 | Ueda et al. | 358/29 C |
| 4,982,290 | 1/1991 | Nishi et al. | 358/29 C |

FOREIGN PATENT DOCUMENTS

| | | | |
|---|---|---|---|
| 0124190 | 7/1985 | Japan | 358/41 |
| 0200694 | 10/1985 | Japan | 358/29 C |

*Primary Examiner*—James J. Groody
*Assistant Examiner*—Safet Metjahic
*Attorney, Agent, or Firm*—Robin, Blecker, Daley & Driscoll

[57] ABSTRACT

A still image sensing apparatus comprising an image sensor, a memory circuit for writing therein the video signal for one field or one frame from the image sensor, a detecting circuit for detecting the color temperature information of a light source related to an object being photographed on the basis of the aforesaid video signal, and a control circuit receptive of an output of the detecting circuit for controlling the white balance of a video signal read from the memory circuit.

31 Claims, 10 Drawing Sheets

CENTER-WEIGHTED COLORIMETRY TYPE

FIG.8(a)

PARTIAL COLORIMETRY TYPE

FIG.8(b)

SKIPPING-IN-READING COLORIMETRY TYPE

WHITE BALANCE CONTROL FOR STILL IMAGE SENSING APPARATUS

BACKGROUND OF THE INVENTION

1. Field of the Invention

This invention relates to a still image sensing apparatus in which the white balance is controlled by the video signal output from an image sensor.

2. Description of the Related Art

In the white balance control of the still image sensing apparatus, it has been the typical practice that, besides the image sensor, there is provided a colorimetric sensor for detecting the color temperature information of the light source. Based on the output of this senor, the video signals output from the image sensor are controlled so as to obtain good white balance.

However, the above-described conventional method not only necessitates the use of the colorimetric sensor, but also cannot make accurate white balance control when the color temperature of the light source at which the colorimetric sensor aims differs from that of a virtual light source which is illuminating an object being photographed.

Another problem of the prior known method is that the so-called release time lag gets longer, because the time space necessary to detect the color temperature information and then make preparation for the white balance control up to its completion must fall within the interval from the depression of the shutter button to the initiation of an actual exposure. In this case, it often happens that the real color temperature information differs from the measured one at the time of colorimetry.

SUMMARY OF THE INVENTION

The present invention has been made to eliminate such problems, and its object is to provide a still image sensing apparatus which does not necessitate a colorimetric sensor, while nevertheless enabling accurate white balance to be performed, and whose release time lag is minimized.

To achieve the above-described object, in an embodiment of the invention, the still image sensing apparatus is constructed in one of the following ways (1) to (7).

(1) The still image sensing apparatus comprises an image sensor, memory means for writing therein a video signal for one field or one frame from the image sensor, detecting means for detecting color temperature information of a light source related to an object on the basis of the video signal, and control means receptive of an output of the detecting means for controlling the white balance of a video signal read from the memory means.

(2) The still image sensing apparatus comprises an image sensor, detecting means for detecting color temperature information of a light source related to an object on the basis of a video signal obtained by a first reading from the image sensor, and control means receptive of an output of the detecting means for controlling the white balance of a video signal obtained by a second reading from the image sensor.

(3) In the aforesaid way (2), as the video signal obtained by the first reading from the image sensor, use is made of a partial video signal obtained by partial reading of one picture, or by skipping in the reading.

(4) In the aforesaid way (2), the still image sensing apparatus further comprises a lens for forming an optical image of the object on the image sensor, focus adjusting means for adjusting focus of the lens, and means for instructing the focus adjusting means to bring the lens into a defocus state during the first reading from the image sensor.

(5) In the aforesaid way (2), the still image sensing apparatus further comprises a zoom lens for forming an optical image of the object on the image sensor, zoom adjusting means for varying the focal length of the zoom lens, and means for instructing the zoom adjusting means to set the zoom lens to a wide-angle state during the first reading from the image sensor.

(6) In the aforesaid way (2), the still image sensing apparatus further comprises a diffusing plate capable of being inserted into and withdrawn from an optical path to the image sensor for diffusing light, diffusing plate control means for controlling the insertion and withdrawal of the diffusing plate into and from the optical path, and means for instructing the diffusing plate control means to bring the diffusing plate into the inserted state during the first reading from the image sensor.

(7) In the aforesaid way (2), the still image sensing apparatus further comprises memory means for writing therein the video signal obtained by the first reading from the image sensor, wherein the video signal read from the memory means is supplied to the detecting means.

By the above-described ways (1) to (7), with the use of only the video signal output from the image sensor, the accurate white balance control can be made. Also, according to an embodiment of the way (1), the video signal output from the image sensor is stored in the memory means, and a control signal for white balance is formed from the video signal output from the image sensor. Hence, it is made possible not only to increase the accuracy of white balance control, but also to carry out photography with a minimum release time lag. According to the way (3), it is further made possible either to select a suitable one of conditions to obtain the color temperature information of the light source related to the object, or to shorten the reading time. According to the ways (4) to (6), a white balance control which is little affected by the color of the object itself becomes possible According to the way (7), a white balance control with high accuracy becomes possible.

Other objects and features of the invention will become apparent from the following description of the specification.

DETAILED DESCRIPTION OF THE PREFERRED EMBODIMENTS

The present invention is next described in connection with embodiments thereof.

Figure 1:
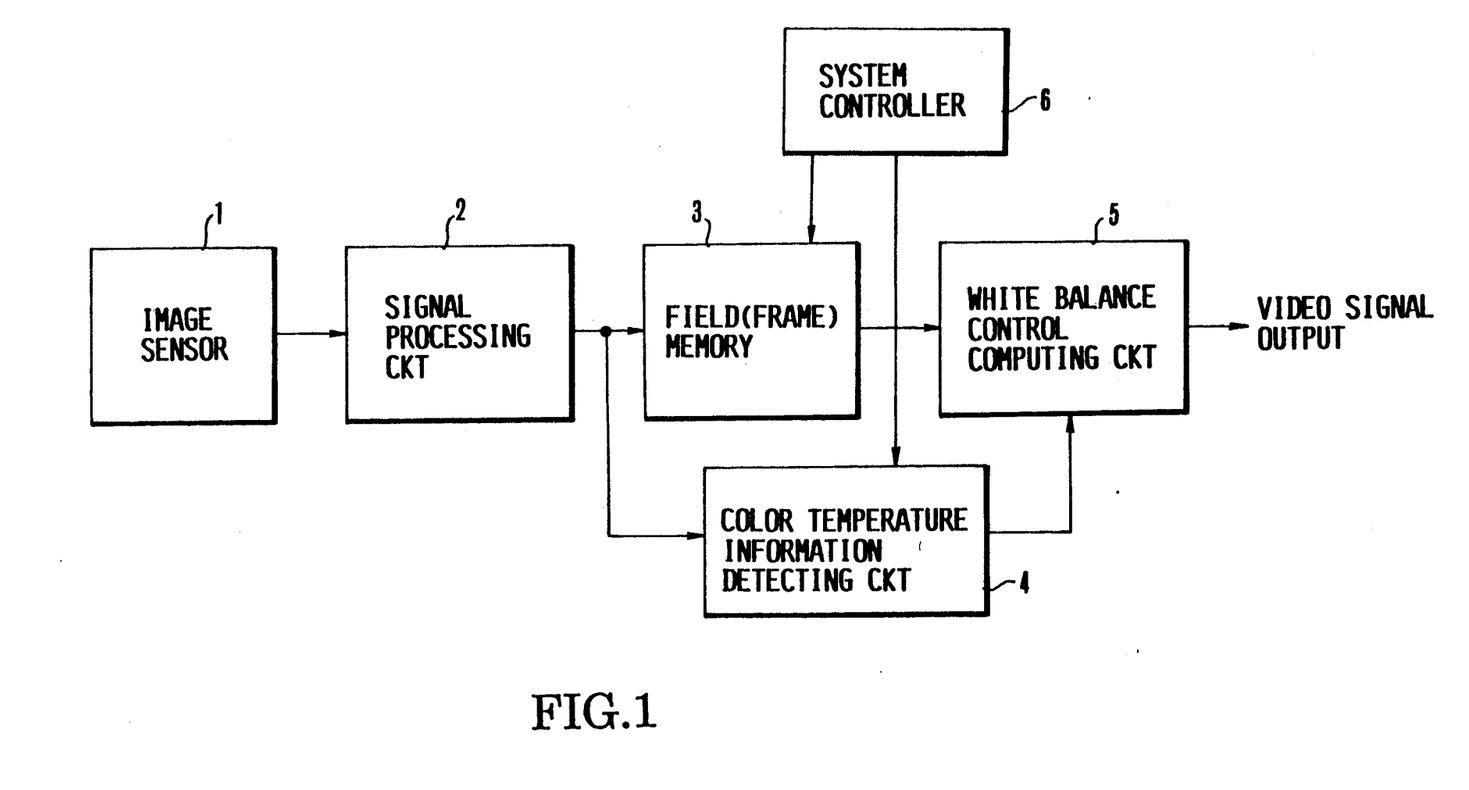
FIG. 1 is a block diagram of the outline of a first embodiment of the invention.

FIG. 1 in block diagram schematically shows a first embodiment of a still image sensing apparatus according to the invention, comprising an image sensor 1, a signal processing circuit 2 for processing a video signal output from the image sensor 1, a memory 3 (storing means) for temporarily storing the processed still video signal for one field or one frame, a detecting circuit 4 for detecting color temperature information of a light source illuminating an object being photographed or a light source which is an object being photographed (hereinafter called the "light source related to the object") on the basis of the video signal output from the signal processing circuit 2, a computing circuit 5 (white balance control means) for controlling white balance of the video signal output from the memory 3, and a system controller 6 using a microcomputer or the like for controlling the operations of the entirety of the system including the reading and writing operations in the aforesaid memory 3 and the color temperature information detecting circuit 4.

Figure 2:
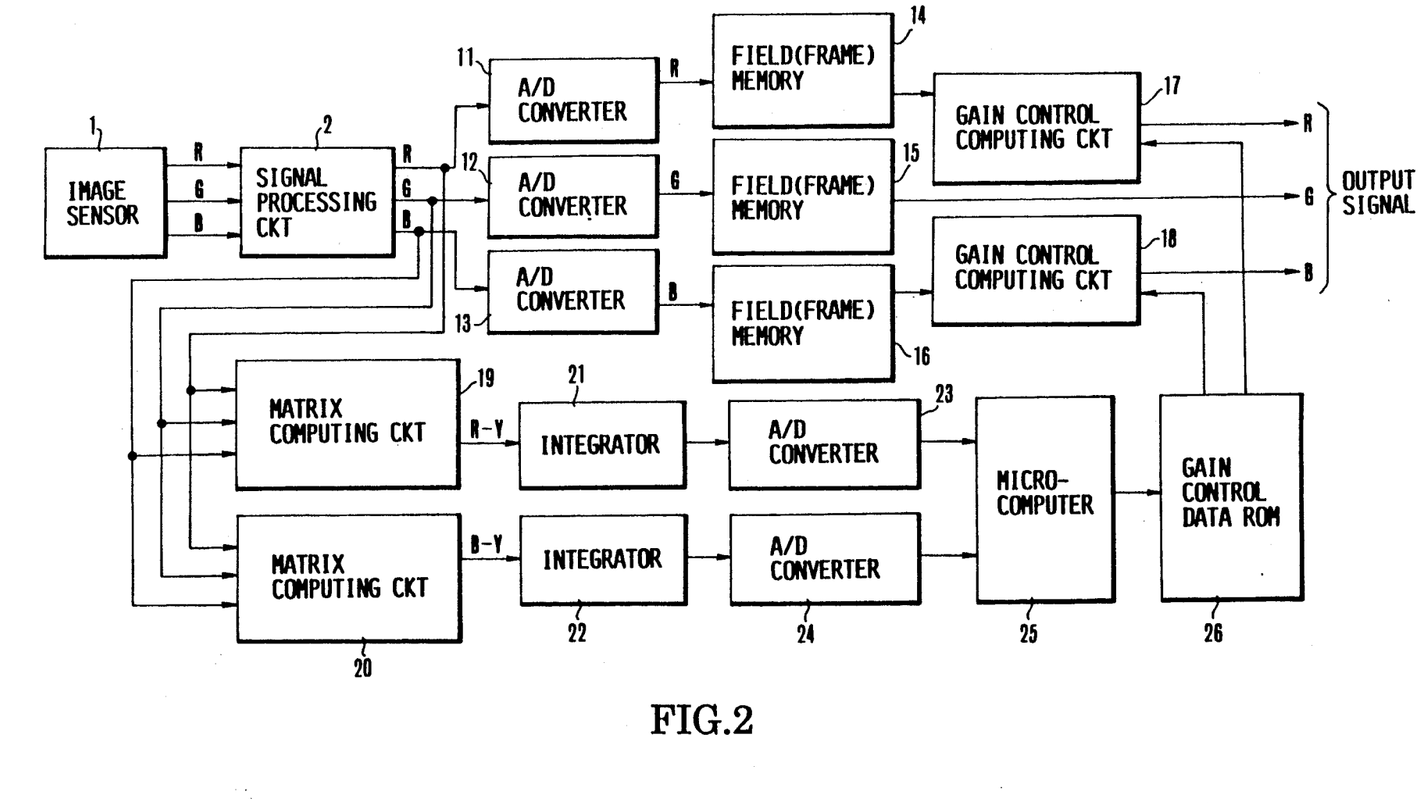
FIG. 2 is a more detailed block diagram of the same embodiment.

The white balance control is explained by using FIG. 2 showing the block diagram of the details of the first embodiment. In the figure, an image sensor 1 and a signal processing circuit 2 have the same functions as those of the blocks of FIG. 1 which are denoted by the same reference numerals. In the image sensor 1, a field or a frame of an image is converted into R, G and B video signals, which are then treated in the signal processing circuit 2. The outputs R, G and B of the circuit 2 are supplied respectively to A/D converters 11, 12 and 13 and therefrom to field or frame memories 14, 15 and 16. The gains of the R and B video signals output from the memories 14 and 16 are controlled by computing circuits 17 and 18, respectively. Matrix computing circuits 19 and 20 produce color-difference signals R-Y and B-Y respectively. Integrators 21 and 22 integrate the R-Y and B-Y signals, respectively. A/D converters 23 and 24 convert the outputs of the integrators 21 and 22 into digital data form respectively. Based on the data of the A/D converters 23 and 24, a microcomputer 25 selects control amounts from a table of a gain control data ROM 26 so as to obtain correct white balance. Signals representing the selected control amounts are supplied to the gain control computing circuits 17 and 18.

That the correct white balance can be obtained by the white balance control circuit of such a construction (19 to 26: color temperature information detecting circuit 4) is known in the art and therefore, explanation thereof is omitted.

In such a manner, the signal to be used in the white balance control is formed from the video signal from the image sensor. Accordingly, the color temperature information of the light source related to the object being photographed can be grasped without error, thus providing a possibility of making an accurate white balance control.

Also since, as the video signals to be subjected to white balance treatment are stored in the field (frame) memories 14 to 16, time to spare is afforded, sufficient examination on selection of data for the accurate white balance control is possible. Hence, the accurate white balance control can be effected.

The blocks 19 to 26 in FIG. 2 correspond to the detecting means for detecting the color temperature information of the light source related to the object being photographed in the present embodiment, and the blocks 17 and 18 correspond to the control means for controlling the white balance in the present embodiment.

Figure 4:
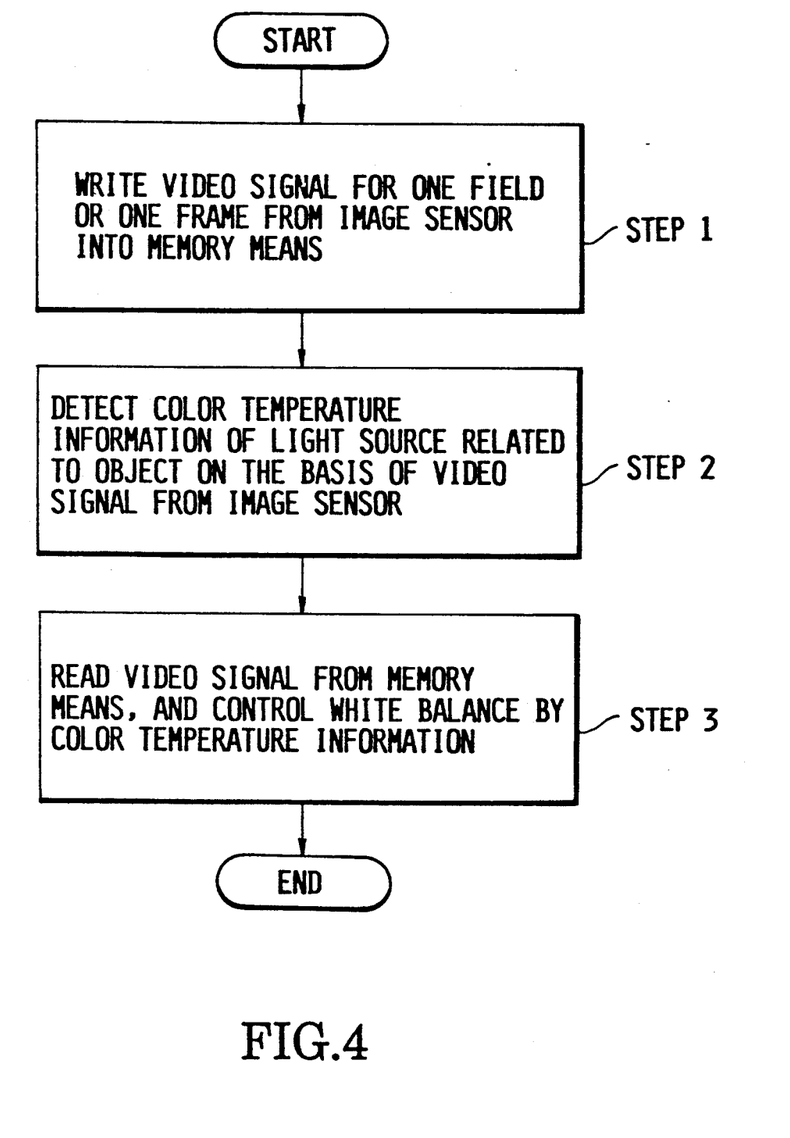
FIG. 4 is a flowchart briefly illustrating the operation of each of the first and second embodiments.

The above-described operation of the embodiment can be shown by a flowchart of FIG. 4, where the output of the image sensor 1 after having been processed is first written in the memory 3 (step 1) and, at the same time, the output of the signal processing circuit 2 is supplied to the color temperature information detecting circuit 4, so that the white balance control signal is formed (step 2). Then, the signal written in the memory 3 is read out and, for these signals, the white balance is controlled based on the aforesaid white balance control signal (step 3). It is to be noted that such coordinations are controlled by the before-described system controller 6.

Figure 3:
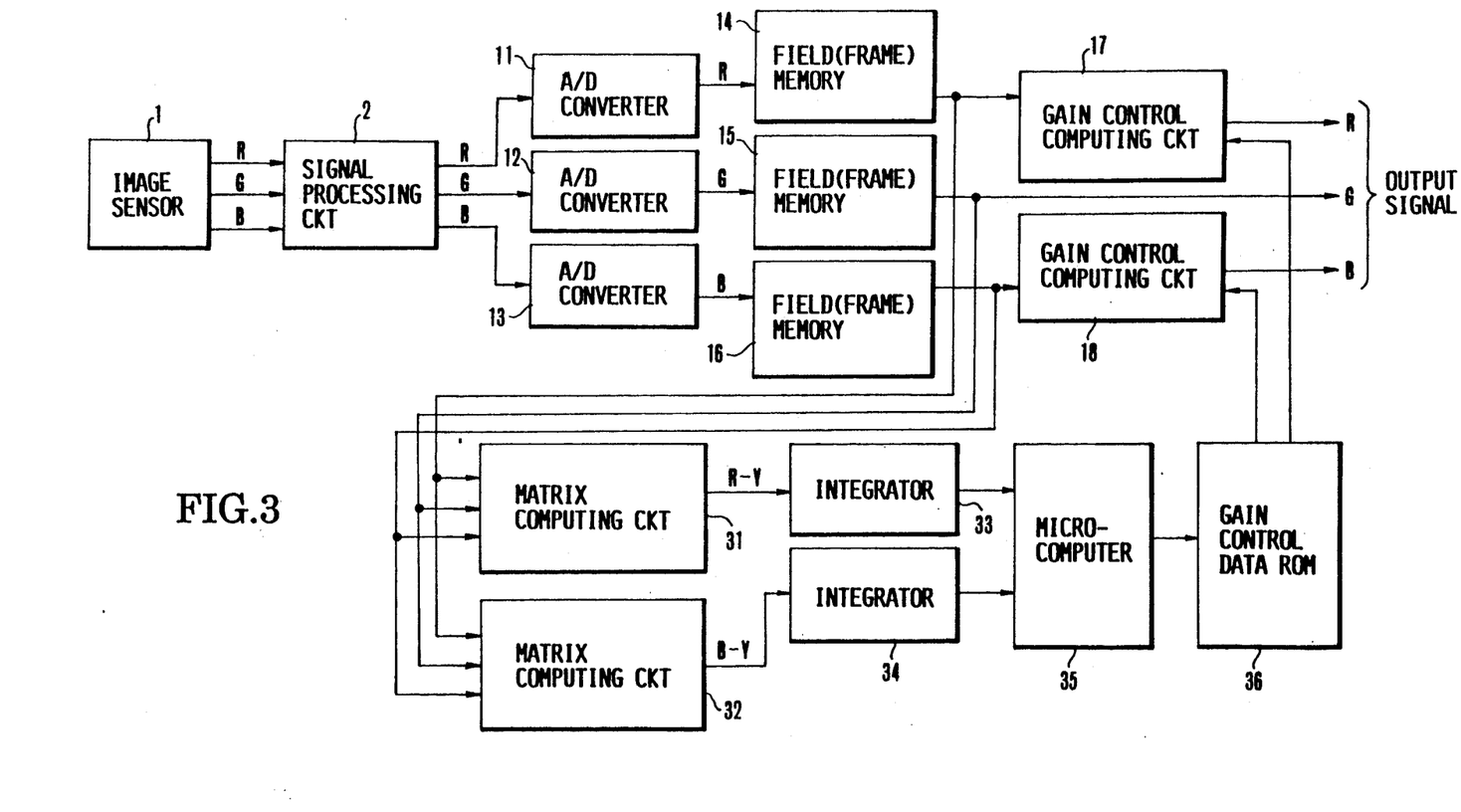
FIG. 3 is a detailed block diagram of a second embodiment of the invention.

FIG. 3 shows a second embodiment of the invention, in which an image sensor 1, a signal processing circuit 2, A/D converters 11, 12 and 13, field (frame) memories 14, 15 and 16 and gain control computing circuits 17 and 18 are of the same functions as those of the parts of FIG. 2 which are denoted by the same reference numerals.

To obtain the white balance control signal, in the present embodiment, the outputs of the field memories 14, 15 and 16, or the R, G and B digital video signals, are used. Digital matrix computing circuits 31 and 32 produce color-difference signals R-Y and B-Y, respectively. These color-difference signals are integrated by integrators 33 and 34. Based on the color-difference signal integration data formed by the integrators 33 and 34, a microcomputer 35 selects, from a table of a gain control data ROM 36, control amounts to obtain the correct white balance. The selected control amounts are supplied to the gain control computing circuits 17 and 18.

Since, in the present embodiment, the output signals of the field (frame) memories 14, 15 and 16 are used as the signals detected to control the white balance, sufficient examination for selection of control data for the correct white balance is possible and it is also possible to recycle the reading of the memories 14, 15 and 16 any number of times to correct the control data for the white balance.

Another or third embodiment of the invention is described. Instead of the feed-forward control on the white balance in the above-described second embodiment, a feedback control on the white balance is made by using the output signals of the gain control computing circuits 17 and 18 and the field (frame) memory 15 as the feedback signals, thereby giving an advantage of increasing the accuracy of white balance control.

As has been described above, according to the invention, the video signal output from the image sensor is stored in the memory means and, by using the video signal output from the image sensor, the control signal for white balance is formed. This enables an accurate white balance control to be made, and the release time lag to be minimized.

Figure 5:
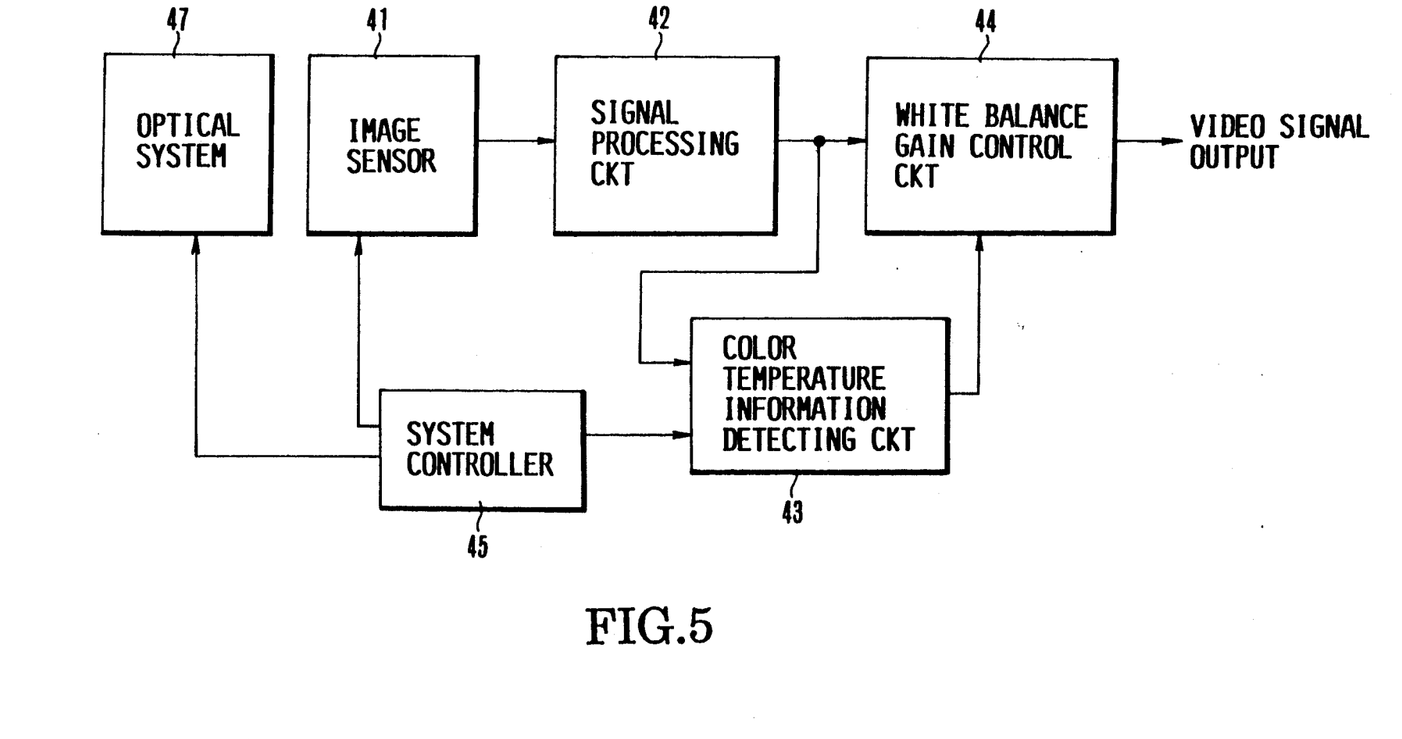
FIG. 5 is a detailed block diagram of the outline of a fourth embodiment of the invention.

FIG. 5 in block diagram schematically shows a fourth embodiment of the still image sensing apparatus according to the invention, comprising an image sensor 41, a signal processing circuit 42 for processing a video signal output from the image sensor 41, a detecting circuit 43 (detecting means) for detecting color temperature information of a light source illuminating an object being photographed or a light source that is the object (hereinafter called the "light source related to the object") on the basis of the video signal output from the signal processing circuit 42, a gain control circuit 44 (control means) for controlling the white balance, a system controller 45 for controlling the coordinations of the aforesaid image sensor 41, color temperature information detecting circuit 43 and others, and an optical system 47 having a focusing means and a zooming means.

Figure 6:
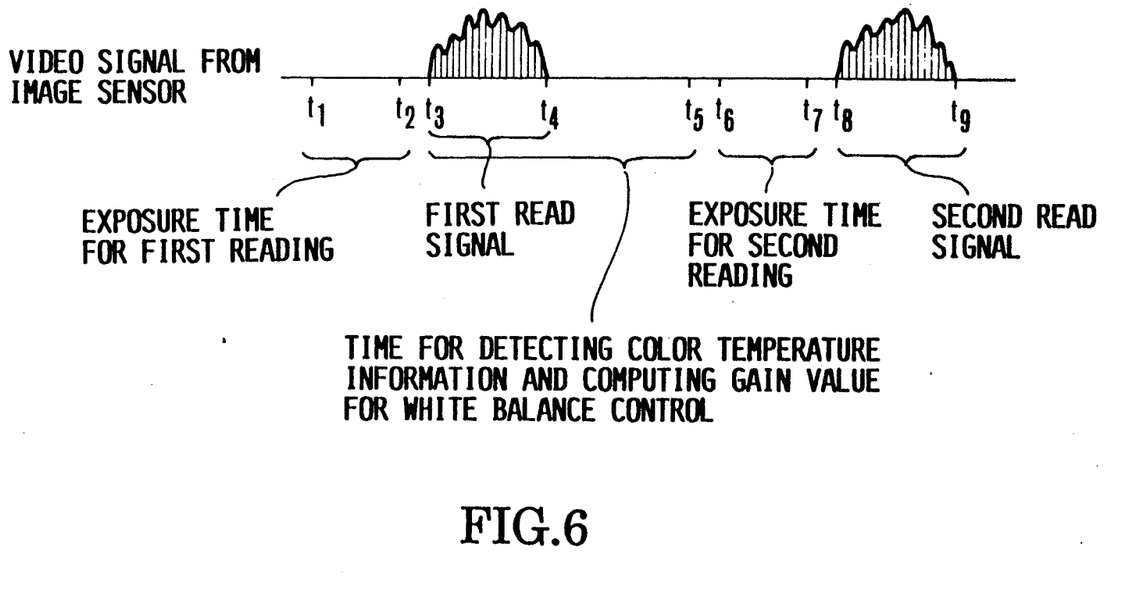
FIG. 6 is a timing chart illustrating a manner in which the apparatus of FIG. 5 operates.

The operation of the apparatus of such a construction is described by using the timing chart of FIG. 6.

The image sensor 41 is first exposed to an object image for a first reading for a time $t_1-t_2$ of FIG. 6 and then the video signal is read out for another time $t_3-t_4$. This first read signal passes through the signal processing circuit 42 and therefrom is supplied to the color temperature information detecting circuit 43. Over an extended time $t_3-t_5$, the color temperature information is detected and the gain control value for white balance control is computed. And, for a time $t_6-t_7$, another exposure for a second reading from the image sensor 41 is made while being controlled by the system controller 45. The second reading is effected for a time $t_8-t_9$. This second read signal is subjected to gain control in the white balance gain control circuit 44 by the output of the color temperature information detecting circuit 43 which is produced while being controlled by the system controller 45.

Figure 7:
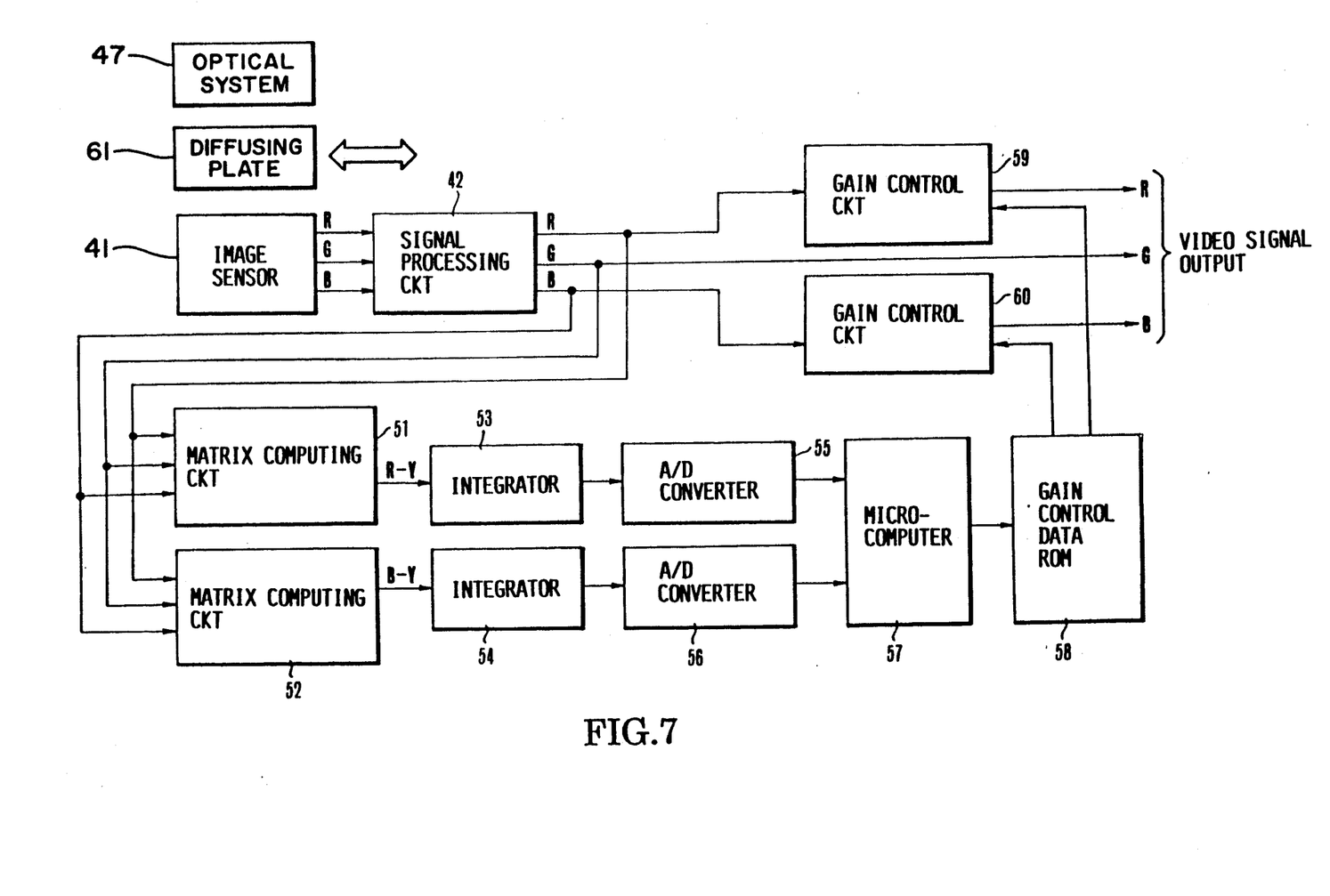
FIG. 7 is a more detailed block diagram of the fourth embodiment.

Concerning the above-described arrangement of the color temperature information detecting circuit 43 and the white balance gain control circuit 44, explanation is given by using FIG. 7.

In FIG. 7, an image sensor 41 and a signal processing circuit 42 are of the same functions as those of the blocks of FIG. 5 which are denoted by the same reference numerals. One field or one frame of image is photoelectrically converted by the image sensor 41 into R, G and B video signals, which are then processed in the signal processing circuit 42. Matrix computing circuits 51 and 52 convert the R, G and B outputs of the signal processing circuit 42 into color-difference signals R-Y and B-Y, respectively. Integrators 53 and 54 integrate the color-difference signals R-Y and B-Y, respectively. A/D converters 55 and 56 convert the outputs of the integrators 53 and 54 into digital data.

Reference numerals 57 and 58 denote a microcomputer and a gain control data ROM, respectively, and reference numerals 59 and 60 denote gain control circuits. Based on the data of the A/D converters 55 and 56, the microcomputer 57 selects the control amounts from the table of the gain control data ROM 58 to obtain the correct white balance, so that the control amounts are supplied to the gain control computing circuits 59 and 60 in a predetermined timing controlled by the microcomputer 57. In the gain control circuits 59 and 60, the gains of the R and B signals are controlled respectively. Thus, the R, G and B output signals that have a correct white balance are obtained.

The blocks 51 to 58 of this practical example correspond to the detecting means in the present embodiment, and the blocks 59 and 60 correspond to the control means in the present embodiment.

Since the correct white balance can be obtained by the circuit (51 to 58: the color temperature information detecting circuit 43) for white balance control, the construction, no more explanation is given here.

Figure 10:
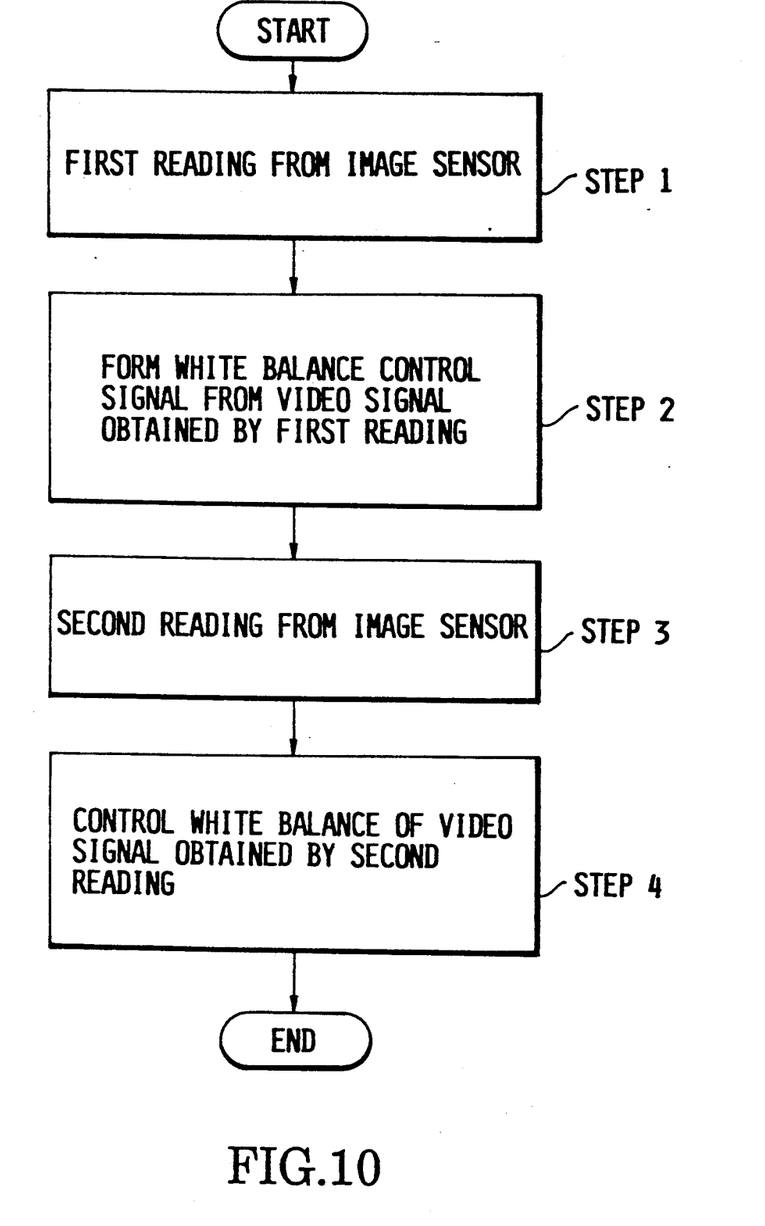
FIG. 10 is a flowchart briefly illustrating the operation of each of the fourth and fifth embodiments.

FIG. 10 shows a flowchart summarizing the operation of the present embodiment, wherein the image sensor 41 is first read for the first reading (step 1), and, from this output, a white balance control signal is formed (step 2). Then, a second reading is carried out (step 3), and, for this output, the white balance control is carried out by using the white balance control signal (step 4).

In the present embodiment, by introducing any one of the following features "a", "b" and "c", the influence of a particular color, for example, the color of the object itself, can be reduced extremely, thereby making it possible to make a more accurate white balance control.

a) Focusing of the lens for forming an optical image on the image sensor 41 is set to, and maintained in, a defocus state for the time $t_1-t_2$ of FIG. 6 (for the first reading time) with the result that an optical LPF (Low-Pass Filter) is previously put on the video signals from which the color temperature information is to be obtained.

b) Zooming of the zoom lens for forming an optical image on the image sensor 41 is set to, and maintained in, the wide-angle state for the time $t_1-t_2$ of FIG. 6 with the result that a particular object does not affect making of the color temperature information of the light source related to the object from the image signal.

c) A light diffusing plate W of the movable type is arranged to be capable of being inserted into and withdrawn from an optical path to the image sensor 41 at, for example, the front of the image sensor, so that, for the time $t_1-t_2$ of FIG. 6, the light passing through the diffusing plate enters the image sensor, thus increasing the accuracy of the light source color temperature information.

Figure 8A:
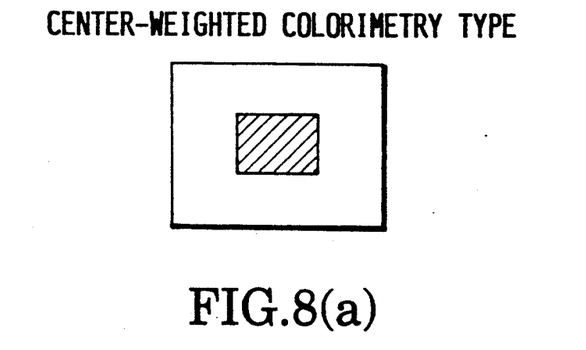
FIGS. 8(a), 8(b) and 8(c) are plan views of examples of variation of the same embodiment.
Figure 8B:
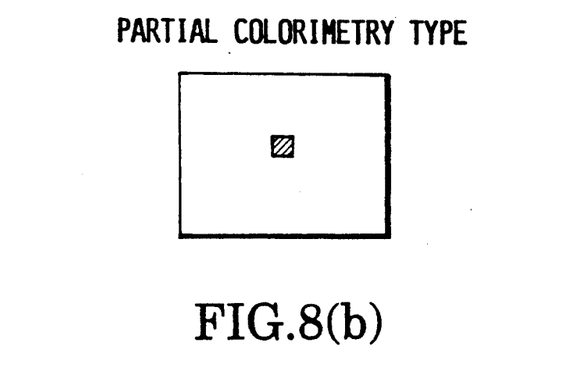
Figure 8C:
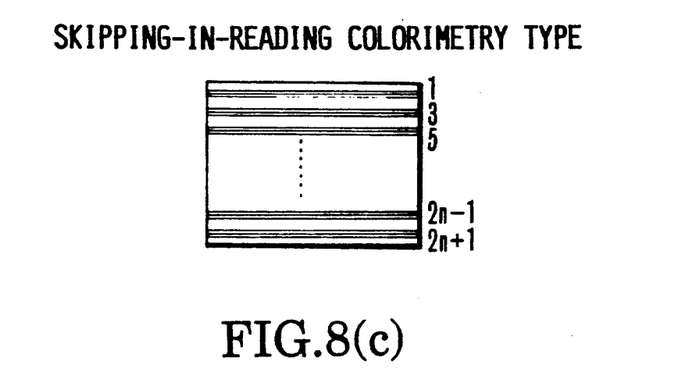

Also, in the present embodiment, the first reading is operated with selection of a mode in which, of the video signal for one field or one frame, only a central portion of the picture is used for colorimetry with an emphasis as shown in FIG. 8(a), another mode in which only a part of the picture is used for colorimetry as shown in FIG. 8(b), and still another mode in which every, for example, second scanning line is skipped when reading for colorimetric purpose as shown in FIG. 8(c), thereby giving an advantage of providing a possibility of selecting the suitable one of the conditions to obtain the color temperature information of the light source related to the object. Another advantage arising from the use of the skipping method is that a shortening of the reading time becomes possible.

Figure 9:
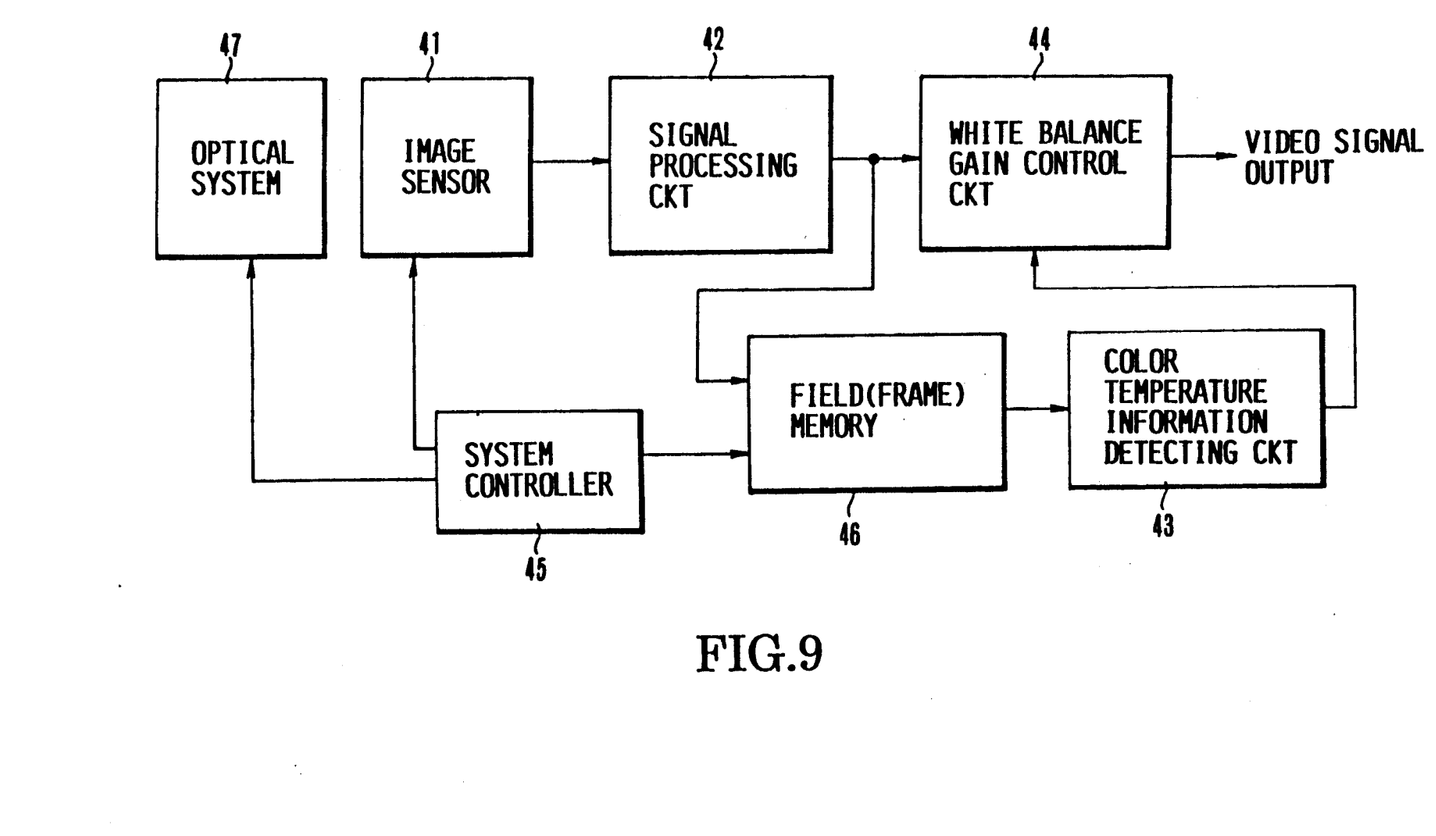
FIG. 9 is a block diagram of the outline of a fifth embodiment of the invention.

FIG. 9 in block diagram schematically shows a fifth embodiment of the still image sensing apparatus according to the invention. In FIG. 9, reference numerals 41 to 44 denote parts of the same functions as those of the circuit blocks of FIG. 5 which are denoted by the same reference numerals. A field or frame memory 46 stores the video signal output from the signal processing circuit 42. The still image sensing apparatus has a system controller 45 and an optical system 47.

In the above-described arrangement, the video signal obtained by the first reading for the period $t_3-t_4$ of FIG. 6 is stored in the field or frame memory 46. After that, the video signal stored in the field or frame memory 46 is read to be supplied to the color temperature information detecting circuit 43, where the color temperature information of the light source related to the object is detected. After this, as a second exposure is carried out, the white balance control is carried out.

In the present embodiment, the field or frame memory 46 is so arranged that the reading of its video signal can be repeated any number of times. Hence, it is made possible to increase the accuracy of gain control for white balance when it is computed by the color temperature information detecting circuit 43.

As has been described above, according to each of the foregoing embodiments, without the necessity of using a colorimetric sensor, the white balance control can be made. Also, because of using no colorimetric sensor, only the color temperature information of the light source related to the object can be detected. This enables the white balance to be controlled with high accuracy.

According to the before-described way (3), either a more suitable condition in which the color temperature information of the light source related to the object is obtained becomes possible to choose, or a shortening of the reading time becomes possible to perform.

According to the before-described ways (4) to (6), it becomes possible to minimize the influence of the color of the object itself on the white balance control.

According to the before-described way (7), the white balance control with a high accuracy becomes possible to perform.

What is claimed is:

1. A still image sensing apparatus comprising image sensing means, memory means for storing substantially one picture of a video signal output from said image sensing means, said memory means delaying the video signal at least for a period substantially corresponding to one picture thereof, detecting means for detecting color temperature information of a light source related to an object being photographed by using at least one picture of the video signal output from said image sensing means, and white balance control means receptive of an output of said detecting means for controlling the white balance of said one picture of the video signal delayed by said memory means.

2. An apparatus according to claim 1, wherein the video signal to be written in said memory means is supplied to said detecting means.

3. An apparatus according to claim 1, wherein the video signal to be supplied to said detecting means is obtained through said memory means.

4. An apparatus according to claim 1, wherein said detecting means has memory means for storing white balance control data.

5. An apparatus according to claim 4, wherein said memory means of said detecting means includes a ROM.

6. A still image sensing method comprising the steps of storing one picture of a video signal output from image sensing means in memory means, detecting color temperature information of a light source of an object being photographed by using at least one picture of the video signal, reading a delayed video signal of a certain picture from said memory means after the detection of color temperature by using the certain picture of the video signal has been completed, and carrying out a white balance correction for the video signal read from said memory means in accordance with the result of the detection.

7. A method according to claim 6, wherein said memory means has a storing capacity of one field or one frame.

8. A still image sensing apparatus comprising:
 (a) image sensing means for producing a video signal by photoelectrically converting an object light;
 (b) memory means for storing and delaying substantially one picture of the video signal;
 (c) control signal forming means for detecting color temperature information for the object on the basis of at least one picture portion of the video signal to form a white balance control signal;
 (d) white balance control means for controlling the white balance of the video signal delayed by said memory means in accordance with the white balance control signal; and
 (e) control means for controlling said memory means so that a certain picture of the video signal is delayed until said white balance control signal has been formed by using the certain picture of the video signal.

9. An apparatus according to claim 8, wherein said memory means has a storing capacity of one field or one frame.

10. An apparatus according to claim 8, wherein said control signal forming means has memory means for storing white balance control data.

11. An apparatus according to claim 10, wherein said memory means of said detecting means includes a ROM.

12. An apparatus according to claim 8, wherein said control means includes a microcomputer.

13. An image sensing apparatus, comprising:
 (a) image sensing means for producing a video signal by photoelectrically converting an object light;
 (b) memory means for temporarily storing the video signal obtained by said image sensing means, said memory means delaying the video signal at least for a period substantially corresponding to one picture thereof;
 (c) control signal forming means for detecting color temperature information for the object on the basis of at least one picture of the video signal to form a white balance control signal; and
 (d) white balance control means for controlling the white balance of a certain picture of the video signal read from said memory means in accordance with the white balance control signal formed by using the certain picture of the video signal.

14. A method according to claim 13, wherein said memory means has a storing capacity of one field or one frame.

15. An apparatus according to claim 13, wherein said detecting means has memory means for storing white balance control data.

16. An apparatus according to claim 13, wherein said memory means of said detecting means includes a ROM.

17. An apparatus according to claim 13, wherein said white balance control means includes an amplifier for amplifying said image signal.

18. An apparatus according to claim 17, wherein said white balance control means further includes control means for reading out the image signal out of said memory means.

19. An apparatus according to claim 18, wherein said control means includes a microcomputer.

20. A still image sensing apparatus comprising image sensing means, detecting means for detecting color temperature information of a light source related to an object on the basis of a video signal obtained by a first reading from said image sensing means, control means receptive of an output of said detecting means for controlling the white balance of a video signal obtained by a second reading from said image sensing means, a lens for forming an optical image of the object on said image sensing means, focus adjusting means for adjusting focus of said lens, and means for instructing said focus adjusting means to bring said lens into a defocus state during the first reading from said image sensing means.

21. A still image sensing apparatus, comprising:
  (a) image sensing means for intermittently producing an electrical signal corresponding to an object light by first and second readings;
  (b) signal processing means for producing a plurality of color information signals in accordance with the electrical signal from said image sensing means;
  (c) integrating means for integrating the plurality of color information signals, respectively, to produce a plurality of integrating results;
  (d) detecting means for detecting color temperature information of a light source related to an object in a period between an end of the first reading and a beginning of the second reading by using the plurality of integrating results which are caused by said first reading; and
  (e) white balance control means for controlling the white balance of the plurality of color information signals caused by said second reading of said image sensing means in accordance with the color temperature information detected by said detecting means.

22. An apparatus according to claim 21, wherein said image sensing means produces a partial signal obtained by partial reading of one picture as said first reading.

23. An apparatus according to claim 21, further comprising a lens for forming an optical image of the object on said image sensing means, focus adjusting means for adjusting focus of said lens, and means for instructing said focus adjusting means to bring said lens into a defocus state during the first reading from said image sensing means.

24. An apparatus according to claim 21, further comprising a zoom lens for forming an optical image of the object on said image sensing means, zoom adjusting means for adjusting zooming of said zoom lens, and means for instructing said zoom adjusting means to bring said zoom lens into a wide-angle state during the first reading from said image sensing means.

25. An apparatus according to claim 21, further comprising a diffusing plate for diffusing light arranged to be capable of being inserted into and withdrawn from an optical path to said image sensing means, diffusing plate control means for controlling the insertion and withdrawal of said diffusing plate into and from the optical path, and means for instructing said diffusing plate control means to bring said diffusing plate into the inserted state during the first reading from said image sensing means.

26. An apparatus according to claim 21, further comprising memory means for writing therein the plurality of color information signals caused by the first reading of said image sensing means, wherein the plurality of color information signals read from said memory means is supplied to said integrating means.

27. An apparatus according to claim 21, wherein said detecting means has memory means for storing white balance control data.

28. An apparatus according to claim 27, wherein said memory means of said detecting means includes a ROM.

29. A still image sensing apparatus comprising:
  (a) image sensing means for producing first and second electrical signals by photoelectrically converting an object light, said first and second electrical signals caused by first and second exposures;
  (b) optical means for controlling light incident on said image sensing means, said optical means obtaining said first and second exposures;
  (c) signal processing means or producing a plurality of color information signals in accordance with said first electrical signal from image sensing means;
  (d) integrating means for integrating the plurality of color information signals, respectively, to produce a plurality of integrating results;
  (e) detecting means for detecting color temperature information of a light source related to an object by using the plurality of integrating results which are caused by said first electric signal in a period between an end of the first exposure and a beginning of the second exposure; and
  (f) white balance control means for controlling the white balance of the plurality of color information signals caused by said second electrical signal in accordance with said color temperature information detected by said detecting means.

30. A still image sensing apparatus comprising:
  (a) image sensing means for intermittently producing an electrical signal corresponding to an object light at first and second periods:
  (b) signal processing means for producing a plurality of color information signals in accordance with electrical signal from image sensing means;
  (c) integrating means for integrating the plurality of color information signals, respectively, to produce a plurality of integrating results;
  (d) detecting means for detecting color temperature information of a light source related to an object by using the plurality of integrating results at the first period in a period between said first and second periods; and
  (e) white balance control means for controlling the white balance of the plurality of color information signals at the second period in accordance with the color temperature information detected by said detecting means.

31. A still image sensing apparatus, comprising:
  (a) image sensing means for intermittently producing a plurality of color information signals at first and second periods:
  (b) detecting means for detecting color temperature information of a light source related to an object by using the plurality of color information signals at the first period in a period between said first and second periods; and
  (c) white balance control means for controlling the white balance of the plurality of color information signals at the second period in accordance with said color temperature information detected by said detecting means.

* * * * *

UNITED STATES PATENT AND TRADEMARK OFFICE
CERTIFICATE OF CORRECTION

PATENT NO. : 5,260,774

DATED : November 9, 1993

INVENTOR(S) : Tsutomu Takayama

It is certified that error appears in the above-indentified patent and that said Letters Patent is hereby corrected as shown below:

Column 3, line 58. After "is insert -- well --

Column 6, line 4. After "construction" insert -- well known in the art --

Column 6, line 61. Change "W" to -- 61 --

Signed and Sealed this

Fifteenth Day of November, 1994

Attest:

BRUCE LEHMAN

Attesting Officer

Commissioner of Patents and Trademarks